Sept. 4, 1951
V. GUILLEMIN, JR
2,566,326
STRAIN GAUGE MANOMETER
Filed Dec. 2, 1946
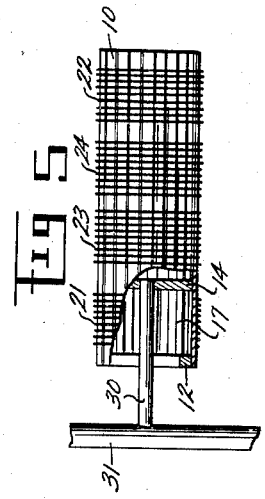
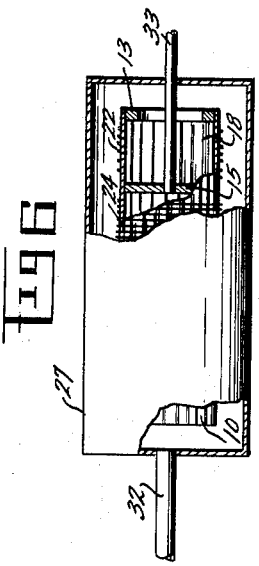
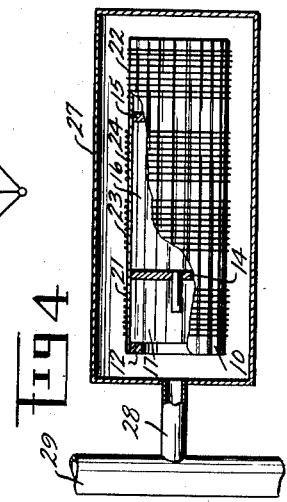
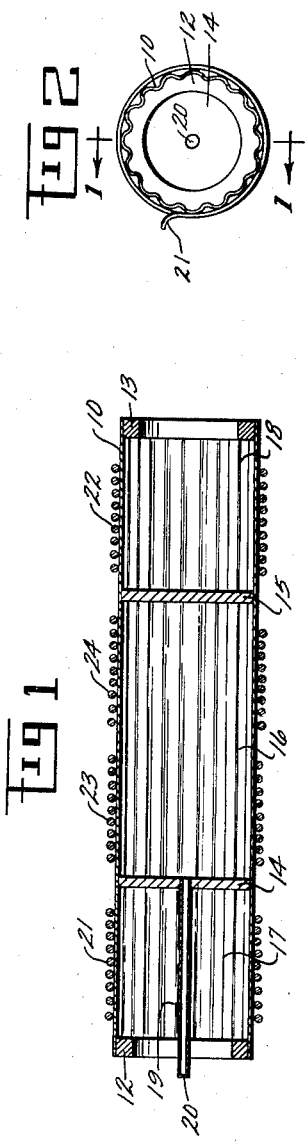
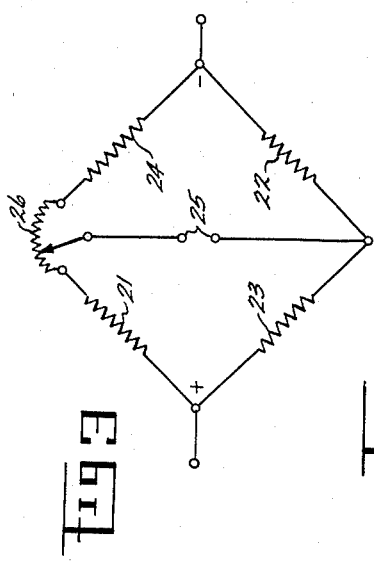
INVENTOR.
VICTOR GUILLEMIN JR.
BY Wade Koontz
Chester Tietz and
HIS ATTORNEYS—

Patented Sept. 4, 1951

2,566,326

UNITED STATES PATENT OFFICE 2,566,326

STRAIN GAUGE MANOMETER

Victor Guillemin, Jr., Dayton, Ohio

Application December 2, 1946, Serial No. 713,445

12 Claims. (Cl. 73—398)

(Granted under the act of March 3, 1883, as amended April 30, 1928; 370 O. G. 757)

The invention described herein may be manufactured and used by or for the Government for governmental purposes without payment to me of any royalty thereon.

This invention relates to a device which is adapted for use in the recording of very rapid pressure changes such as will occur, for example, in a pressurized fighter airplane cabin when the canopy is ruptured by gun-fire. More specifically, the invention relates to a strain-gauge type of manometer in which changes of pressure produce changes of tension in fine wires. The resulting change in length of the wires produces a corresponding change of resistance. The wires are incorporated into an electric circuit containing a high speed oscillograph recorder on which a record is made of these resistance changes. From this record, the pressure changes may be deduced. Devices of this character are also useful in pressure investigations relating to ordnance and internal-combustion engine cylinders.

Numerous devices of the above type have been developed and used. However, the present invention is particularly adapted to record very rapid pressure changes because the moving parts have been reduced to the absolute minimum, namely, (a) a surface upon which the pressure exerts a force, and (b) the wire itself.

Additional advantages of the present invention are that the full force due to the impressed pressure changes is used to stress the wires, and that the wires are compactly arranged, yet well ventilated for good heat dissipation.

In the drawings:

Figs. 1 and 2 show, respectively, a longitudinal section, and a left-end view of one form of the improved manometer which is particularly adapted to record pressure changes occurring in spaces within which the instrument is placed. Fig. 1 is taken on the line 1—1 of Fig. 2;

Fig. 3 is a diagram of the bridge circuit employed;

Fig. 4 is a side elevation, partly in section, of the manometric device within a gas-tight container, which is in section. This form is suitable for remotely recording pressures.

Fig. 5 shows the manometric device, partly in section, with a connection suitable for use with pressures that never drop below ambient; and Fig. 6 is a view corresponding to Fig. 4, the manometric device and its container being shown partly in section. This form is useful as a differential manometer.

Referring to Figs. 1 and 2, 10 is a corrugated tube of very thin flexible metal, which is strengthened at its ends by two metal rings 12 and 13 having their peripheries serrated to match the tube corrugations. This tube is divided, by two rigid metal gas-tight partitions 14 and 15, similarly serrated, into an enclosed portion 16 and two open portions 17 and 18. A free tube 19 communicating with the enclosed space 16 permits the gas pressure therein to be set at any desired value, as explained below, after which the free tube 19 is sealed off at its end 20. Four identical windings of fine wire of enamel-insulated low temperature-coefficient metal 21, 22, 23 and 24 are placed around the tube, 21 and 22 being over the open portions and 23 and 24 over the closed portions of the tube. These windings comprise the four arms of a Wheatstone bridge circuit shown in Fig. 3, the four windings being connected as shown. Terminals are provided at 25 in the usual manner, as shown, for connecting to a high speed mirror galvanometer or cathode ray oscillograph or any other suitable electrical indicating or recording device (not shown). A slidewire resistor 26 is connected as shown. Before operation, the instrument is inflated through the free tube 19 in the enclosed portion 16, to a pressure somewhat higher than the highest pressure to which it is to be subjected externally after which the end 20 is sealed off. This is done to prevent the occurrence of an excess pressure inward on enclosed portion 16 since the thin corrugated walls of tube 10 cannot support inward pressure. Pressure outward on the middle portion of tube 10 is supported almost wholly by the wire windings 23 to 24 inclusive which thus are stressed by practically the full force of the pressure change being recorded. The wire is chosen so that the pressure range to be recorded will not produce strains beyond its elastic limit.

In operation, the manometer is placed within the enclosure in which the pressure changes are to occur. A potential difference is applied to the bridge circuit in the usual manner at the points marked by plus and minus signs and the slide wire 26 is adjusted to bring the indicating or recording device connected to 25 to the desired null or base-line position. Assuming then that the pressure outside of the enclosure 16 suddenly diminishes, the walls of 16 will expand, stretching the windings 23 and 24. The windings 21 and 22 however will not be stretched. As a result, the resistance of the windings 23 and 24 in the bridge circuit (Fig. 3) will increase while that of windings 21 and 22 will remain unchanged. According to the usual, well-understood action of a bridge circuit, the potential at the terminals 25 will change. The resulting action of the indicator or recorder connected to the terminal 25 will be a quantitative measure of the pressure drop. Conversely, if the pressure external to the closed portion 16 increases, the potential at the terminals 25 will change in the opposite direction.

It will be noted that the pressure changes have no effect upon the windings 21 and 22. These could, in fact, be replaced by any suitable pair of resistors. However, since the resistance changes produced by the pressure variations are small, (only several parts per thousand) it is important to have complete temperature equilibrium on all four arms of the bridge circuit and this is obtained most easily by making all four windings identical.

In cases where the instrument is to be used to record pressure changes within an enclosure into which it cannot readily be introduced, the connections shown in Figs. 4 and 5 may be used. In Fig. 4 the instrument is surrounded by a gas-tight rigid enclosure 27 which is connected by means of a tube 28 to the source of pressure changes, shown here as a gas-conducting pipe 29. This arrangement is suitable for recording of either positive or negative pressures, relative to the ambient pressure outside of 27, which do not exceed the pressure in space 16.

If the instrument is to be used for pressures that never drop below ambient, the connection of Fig. 5 may be used. Here a tube 30 connects enclosure 16 to the source of pressure 31, and the pressure variations in 31 are communicated to 16 and recorded in the usual manner as discussed above.

It is possible to deviate from the forms of construction shown above without departing from the spirit of this invention. For example, coils 21 and 22 may be wound on tubes separate from coils 23 and 24 and they may be in a separate enclosure, provided proper temperature control is maintained. Also, in a differential manometer, for example the connections shown in Figs. 4 and 5 may be combined into one instrument as shown in Fig. 6. Here the pressures at the two input tubes 32 and 33 can both be very high (with the pressure in tube 33 always exceeding that in tube 32) while the instrument will record a relatively small pressure change between them.

Finally, in the recording of relatively high pressures, it will not be necessary to corrugate the tube 10 if there is ample pressure available to strain a smooth tube of the usual circular cross-section in addition to the wire. Such a tube will support externally applied pressure, and if wound with properly strained wire may be used to record both positive and negative pressure changes in any of the types of connections shown in Figs. 1, 4, 5 and 6.

The invention claimed is:

1. A strain-gauge manometer comprising a flexible tube, a plurality of wire windings thereon, a sealed gas chamber in said tube and forming a part thereof and encircled by at least two of said windings and an open portion of said tube and encircled by each of the remaining windings, and a bridge circuit having a plurality of arms, each arm having at least one of said windings connected therein.

2. A strain-gauge manometer according to claim 1 in which the gas chamber in the manometer is sealed at a pressure higher than the ambient pressure.

3. A strain-gauge manometer according to claim 1 in which the bridge circuit includes means for distributing the resistance contained in two arms thereof between said two arms.

4. A strain-gauge manometer comprising a flexible tube, a sealed gas chamber therein forming a part thereof, two windings of pre-strained wire on the exterior surface of said tube over said gas chamber, two other windings identical with the first two but wound on the exterior surface of said tube over an open space therein, a Wheatstone bridge circuit, each arm of said circuit having connected therein one of said windings.

5. A strain-gauge manometer according to claim 4 in which the gas chamber in the manometer is sealed at a pressure higher than the ambient pressure.

6. A strain-gauge manometer comprising a flexible tube, a walled gas-tight chamber in the middle portion of said tube forming a part of said tube, a tube extending into said chamber through a wall thereof, four windings of pre-strained, low temperature coefficient wire wound about the exterior surface of said tube, two of said windings being laid side-by-side over said walled chamber and adapted to be included in respective arms of a Wheatstone bridge circuit.

7. A tube according to claim 6 in which an internal ring supports each end of the tube against collapse.

8. A strain-gauge manometer comprising a tube of flexible material, a sealed gas-tight chamber in the middle portion of said tube forming a part thereof, four windings of pre-strained, low temperature coefficient wire wound thereon in side-by-side relation, two of said windings being located over said sealed gas-tight chamber, a rigid, gas-tight shell enclosing said tube and windings thereon and a metallic tube extending into said shell from a space wherein the change of pressure is to be measured.

9. A strain-gauge differential manometer comprising a tube made of flexible material, a pair of walls within the middle portion of said tube, said walls defining a chamber integral with said tube, four windings of pre-strained wire of low temperature coefficient in side-by-side relation on the exterior surface of said tube, two of said windings being over said chamber, a rigid shell enclosing said tube, a second smaller tube extending through one end of said shell and through one wall of said chamber and a third tube, also smaller than the first, extending only through that end of said shell through which the second tube passes.

10. A strain manometer comprising a cylindrical tube of flexible material, walls within said tube defining a gas chamber, at least one of said walls being spaced from the end of the tube, at least one winding on that portion of the tube comprising the chamber and adapted to be stressed thereby, at least one winding on that part of the tube which is not subjected to stress and internal rings at each end of said tube to reinforce said tube ends against collapse.

11. A strain gauge manometer comprising a thin walled metallic highly flexible tube, a sealed gas tight chamber forming a part thereof, two coil windings of uncushioned pre-strained wire on the exterior surface of said tube over said gas chamber, a free tube of substantially smaller diameter extending as to one of its ends into said sealed gas tight chamber, the outer end of said free tube being tightly sealed to and extending from a space wherein the change of pressure is to be measured, a Wheatstone bridge circuit, two fixed resistors, each of a resistance value identical with one of said windings in the respective arms of said bridge circuit, each of the remaining arms having a connection therein common of said windings.

12. In an electrical strain gauge manometer, a flexible thin walled metallic cylindrical tube having a gas-tight sealed section adapted to increase its diameter in response to internal increased pressure, said section being located in substantially the middle portion of said tube, the tube having longitudinal corrugations about said sealed sections, a pre-strained electrically conductive wire laid transverse to said corrugations and insulated therefrom by enamel, said wire having relatively greater tensile strength than the tube.

VICTOR GUILLEMIN, Jr.

REFERENCES CITED

The following references are of record in the file of this patent:

UNITED STATES PATENTS

| Number | Name | Date |
|---|---|---|
| 2,365,015 | Simmons | Dec. 12, 1944 |
| 2,391,966 | Harrison | Jan. 1, 1946 |
| 2,393,714 | Simmons | Jan. 29, 1946 |
| 2,398,372 | Green | Apr. 16, 1946 |
| 2,398,401 | Bancroft et al. | Apr. 16, 1946 |
| 2,420,148 | Ostergren | May 6, 1947 |
| 2,421,907 | Postlewaite | June 10, 1947 |
| 2,455,883 | Statham | Dec. 7, 1948 |
| 2,470,714 | Nevius | May 17, 1949 |
| 2,474,146 | Hathaway | June 21, 1949 |